(12) United States Patent
Sameshima (10) Patent No.: US 8,656,775 B2
(45) Date of Patent: Feb. 25, 2014

(54) VIBRATORY GYRO-SENSOR AND VIBRATORY GYRO CIRCUIT

(75) Inventor: Toshihisa Sameshima, Kagoshima (JP)

(73) Assignee: Sony Corporation, Tokyo (JP)

(*) Notice: Subject to any disclaimer, the term of this patent is extended or adjusted under 35 U.S.C. 154(b) by 256 days.

(21) Appl. No.: 13/298,431

(22) Filed: Nov. 17, 2011

(65) Prior Publication Data

US 2012/0137782 A1    Jun. 7, 2012

(30) Foreign Application Priority Data

Dec. 2, 2010  (JP) .................................. 2010-269772

(51) Int. Cl.
*G01C 19/56*    (2012.01)
(52) U.S. Cl.
USPC ...................................................... 73/504.12
(58) Field of Classification Search
USPC ...................................................... 73/504.12
See application file for complete search history.

(56) References Cited

U.S. PATENT DOCUMENTS

2008/0276708 A1    11/2008    Kurihara
2010/0307243 A1*    12/2010    Prandi et al. ............... 73/504.12

FOREIGN PATENT DOCUMENTS

JP    2006-105896    4/2006

* cited by examiner

*Primary Examiner* — John Chapman, Jr.
(74) *Attorney, Agent, or Firm* — Dentons US LLP (57) ABSTRACT

Disclosed herein is a vibratory gyro-sensor including a vibratory section, a synchronous detector which synchronously detects a detected signal from the vibratory section in timed relation to a timing signal for synchronous detection, and a timing signal output section which outputs the timing signal for synchronous detection. The timing signal output section has a low-pass filter, a comparator, and a first phase shifter. The vibration monitor signal as converted into the binary signal by the comparator and shifted in phase by the first phase shifter is used as the timing signal for synchronous detection.

10 Claims, 11 Drawing Sheets

PHASE SHIFT = $\tan^{-1} \dfrac{-2 \times R \times C}{1-(R \times C)^2}$

(19)United States
(12)Patent Application Publication

VIBRATORY GYRO-SENSOR AND VIBRATORY GYRO CIRCUIT

BACKGROUND

The present disclosure relates to a vibratory gyro-sensor and a vibratory gyro circuit for use in a vibratory gyro-sensor.

Heretofore, vibratory gyro-sensors have widely been used as a sensor for detecting an angular velocity (see, for example, Japanese Patent Laid-Open No. 2006-105896 (Paragraphs [0026] through [0030], [0049] FIGS. 1, 6) referred to as Patent Document 1 hereinafter).

As shown in FIG. 1 of Patent Document 1, the vibratory gyro-sensor disclosed in Patent document 1 has a vibratory gyro 31 and a vibratory gyro circuit. The vibratory gyro 31 includes two piezoelectric elements 33a, 33b disposed on a side surface of a vibrator 32. The vibratory gyro circuit includes an adding circuit 1, an oscillating circuit 2, a differential amplifying circuit 4, a synchronous detecting circuit 5, a phase shifting circuit 3, and a direct current amplifying circuit 6.

The oscillating circuit 2 outputs a drive signal to the vibratory gyro 31. The adding circuit 1 adds output signals from the two piezoelectric elements 33a, 33b of the vibratory gyro 31 and outputs the sum signal. The oscillating circuit 2 adjusts the amplitude and phase of the sum signal from the adding circuit 1, and supplies the adjusted signal as the drive signal to the vibratory gyro 31. The differential amplifying circuit 4 outputs a signal depending on the difference between the output signals from the two piezoelectric elements 33a, 33b. The synchronous detecting circuit 5 synchronously detects the signal output from the differential amplifying circuit 4 depending on a timing signal output from the phase shifting circuit 3. The direct current amplifying circuit 6 amplifies the signal which is synchronously detected by the synchronous detecting circuit 5 and outputs the amplified signal.

As shown in FIG. 6 of Patent Document 1, the phase shifting circuit 3 includes a phase shifting section (having an integrating circuit, an operational amplifier 65, etc.) for shifting the phase of the output signal from the adding circuit 1, and a comparator 66 for binarizing a signal output from the phase shifting section and outputting the binarized signal as the timing signal for the synchronous detecting circuit 5. A signal used as a threshold value by the comparator 66 is generally represented by a reference voltage from a peripheral circuit.

SUMMARY

The signal output from the adding circuit 1 (hereinafter referred to as vibration monitor signal) is a sine-wave signal having a vibrational frequency component only under ideal conditions. Actually, however, since the impedance of the vibratory gyro 31 or the vibratory gyro circuit varies with time after the power supply is turned on, the low-frequency component of the vibration monitor signal may fluctuate.

If such a phenomenon occurs, then since the fixed reference potential is used as the threshold value for the comparator 66, when the vibration monitor signal is binarized into a timing signal by the comparator 66, the timing signal has an "H" interval and an "L" interval that are different from each other. When the timing signal is thus shifted, the synchronous detecting circuit 5 fails to accurately synchronously detect the signal output from the differential amplifying circuit 4, thereby tending to add noise to an angular velocity signal.

Accordingly, it is desirable to provide a technology such as a vibratory gyro-sensor, and the like, which is capable of generating a timing signal for synchronous detection which has an "H" interval and an "L" interval that are substantially equal to each other even if the low-frequency component of a vibration monitor signal fluctuates.

A vibratory gyro-sensor according to an embodiment of the present disclosure includes a vibratory section, a synchronous detector, and a timing signal output section.

The synchronous detector synchronously detects a detected signal from the vibratory section in timed relation to a timing signal for synchronous detection.

The timing signal output section includes a low-pass filter, a comparator, and a first phase shifter.

The low-pass filter extracts a low-frequency component of a vibration monitor signal representative of a vibrating state of the vibrating section.

The comparator converts the vibration monitor signal into a binary signal using the low-frequency component of the vibration monitor signal which is extracted by the low-pass filter as a threshold value.

The first phase shifter shifts the phase of the vibration monitor signal.

The timing signal output section outputs the vibration monitor signal as converted into the binary signal by the comparator and shifted in phase by the first phase shifter, as the timing signal for synchronous detection.

In the vibratory gyro sensor, the comparator converts the vibration monitor signal into the binary signal using the low-frequency component of the vibration monitor signal which is extracted by the low-pass filter as the threshold value. Since the low-frequency component of the vibration monitor signal serves as the threshold value of the comparator, even if the low-frequency component of the vibration monitor signal varies due to a time-dependent change in the impedance of the vibratory section, for example, the threshold value of the comparator also varies in a manner to follow such variations of the vibration monitor signal. Therefore, even if the low-frequency component of the vibration monitor signal varies, the comparator can generate a binary signal having an "H" interval and an "L" interval that are substantially equal to each other. As a consequence, the synchronous detector can synchronously detect the detected signal at an appropriate timing, so that noise is prevented from being added to the angular velocity signal.

The first phase shifter may shift the phase of the vibration monitor signal after the vibration monitor signal is converted into the binary signal by the comparator. Alternatively, the first phase shifter may shift the phase of the vibration monitor signal before the vibration monitor signal is converted into the binary signal by the comparator.

If the first phase shifter shifts the phase of the vibration monitor signal before the vibration monitor signal is converted into the binary signal by the comparator, then the first phase shifter may be of a simple circuit arrangement for shifting the phase of analog signals. The vibratory gyro sensor may thus be reduced in cost.

If the first phase shifter shifts the phase of the vibration monitor signal after the vibration monitor signal is converted into the binary signal by the comparator, then the first phase shifter may include a phase comparator, a loop filter, a voltage-controlled oscillator, a frequency divider, and a timing generator.

The phase comparator outputs a phase difference signal depending on the phase difference between the vibration monitor signal is converted into the binary signal by the comparator and a comparison signal.

The loop filter smoothes the phase difference signal and outputs a frequency control signal.

The voltage-controlled oscillator outputs an oscillation signal having frequency characteristics depending on the frequency control signal.

The frequency divider outputs a frequency-divided signal produced by frequency-dividing the oscillation signal at a predetermined ratio as the comparison signal.

The timing generator inputs the oscillation signal and the frequency-divided signal and outputs the vibration monitor signal as converted into the binary signal and shifted in phase.

Since the first phase shifter is of a PLL (Phase Locked Loop) circuit arrangement, even if the frequency of the vibration monitor signal varies, it can accurately shift the phase of the binary signal in a manner to follow such variations of the frequency of the vibration monitor signal.

The vibratory gyro-sensor may further include a drive signal output section.

The drive signal output section includes a second phase shifter and an amplitude adjuster.

The second phase shifter shifts the phase of the vibration monitor signal.

The amplitude adjuster adjusts the amplitude of the vibration monitor signal.

The drive signal output section outputs the vibration monitor signal as shifted in phase by the second phase shifter and adjusted in amplitude by the amplitude adjuster, as the drive signal for the vibratory section.

In the vibratory gyro-sensor, the first phase shifter may shift the phase of the vibration monitor signal before the vibration monitor signal is converted into the binary signal by the comparator.

In this case, the second phase shifter may shift the phase of the vibration monitor signal before the vibration monitor signal is adjusted in amplitude by the amplitude adjuster.

The first phase shifter and the second phase shifter may be in the form of a single common phase shifter.

Since the single common phase shifter is used as the first phase shifter and the second phase shifter, the cost of the vibratory gyro-sensor is reduced.

In the vibratory gyro-sensor, the low-pass filter may have a cutoff frequency of 100 Hz or higher.

With the cutoff frequency of the low-pass filter being set to 100 Hz or higher, any phase delay of the signal which has passed through the low-pass filter, i.e., the signal serving as the comparator threshold value, is 1° or smaller at a frequency of 1 Hz or lower. Therefore, the signal which has passed through the low-pass filter, i.e., the signal serving as the comparator threshold value, can accurately follow variations of the low-frequency component of the vibration monitor signal. The comparator can thus generate a binary signal having an "H" interval and an "L" interval that are substantially equal to each other.

The low-pass filter may include a resistor and a capacitor. Alternatively, the low-pass filter may include a filter circuit including a switched capacitor.

A vibratory gyro circuit according to an embodiment of the present disclosure includes a synchronous detector and a timing signal output section.

The synchronous detector synchronously detects a detected signal from a vibratory section in timed relation to a timing signal for synchronous detection.

The timing signal output section includes a low-pass filter, a comparator, and a first phase shifter.

The low-pass filter extracts a low-frequency component of a vibration monitor signal representative of a vibrating state of the vibrating section.

The comparator converts the vibration monitor signal into a binary signal using the low-frequency component of the vibration monitor signal which is extracted by the low-pass filter as a threshold value.

The first phase shifter shifts the phase of the vibration monitor signal.

The timing signal output section outputs the vibration monitor signal as converted into the binary signal by the comparator and shifted in phase by the first phase shifter, as the timing signal for synchronous detection.

According to an embodiment of the present disclosure, as described above, even if the low-frequency component of the vibration monitor signal varies, the vibratory gyro-sensor can generate a timing signal for synchronous detector which has an "H" interval and an "L" interval that are substantially equal to each other.

DETAILED DESCRIPTION OF THE PREFERRED EMBODIMENTS

Preferred embodiments of the present disclosure will be described in detail below with reference to the drawings.

First Embodiment

[Overall Arrangement and Details of a Vibratory Gyro-Sensor]

Figure 1:
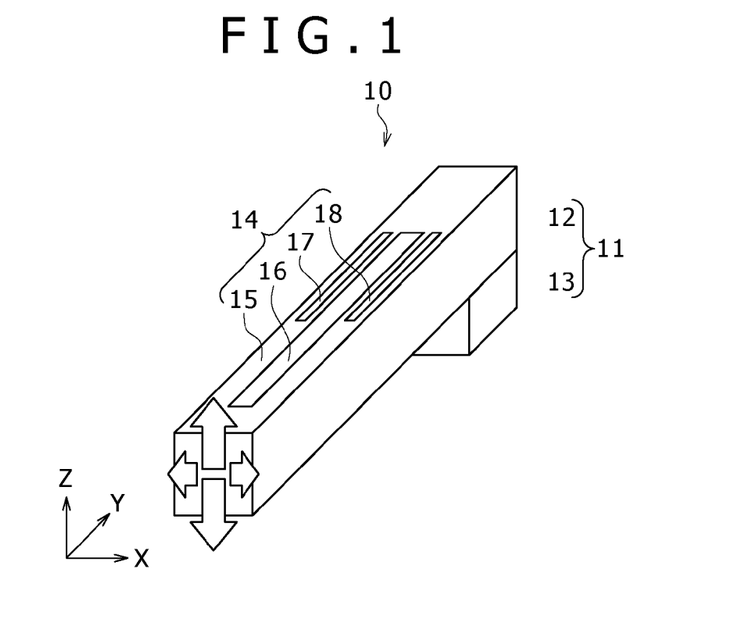
FIG. 1 is a schematic perspective view of a vibratory section of a vibratory gyro-sensor according to an embodiment of the present disclosure.
Figure 2:
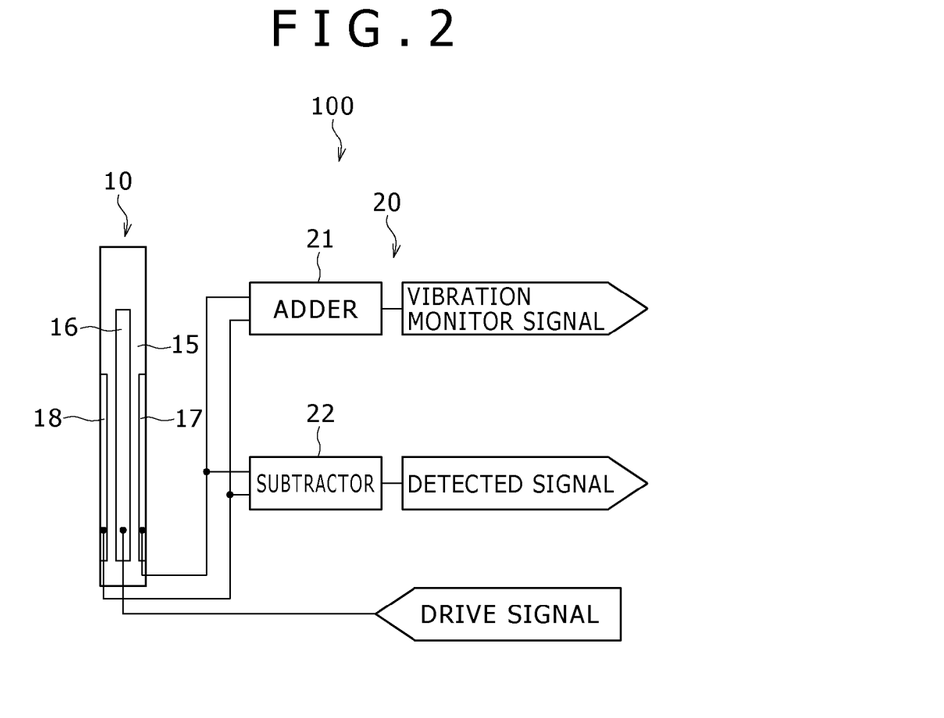
FIG. 2 is a wiring diagram of the vibratory section and a vibratory gyro circuit of the vibratory gyro-sensor.
Figure 3:
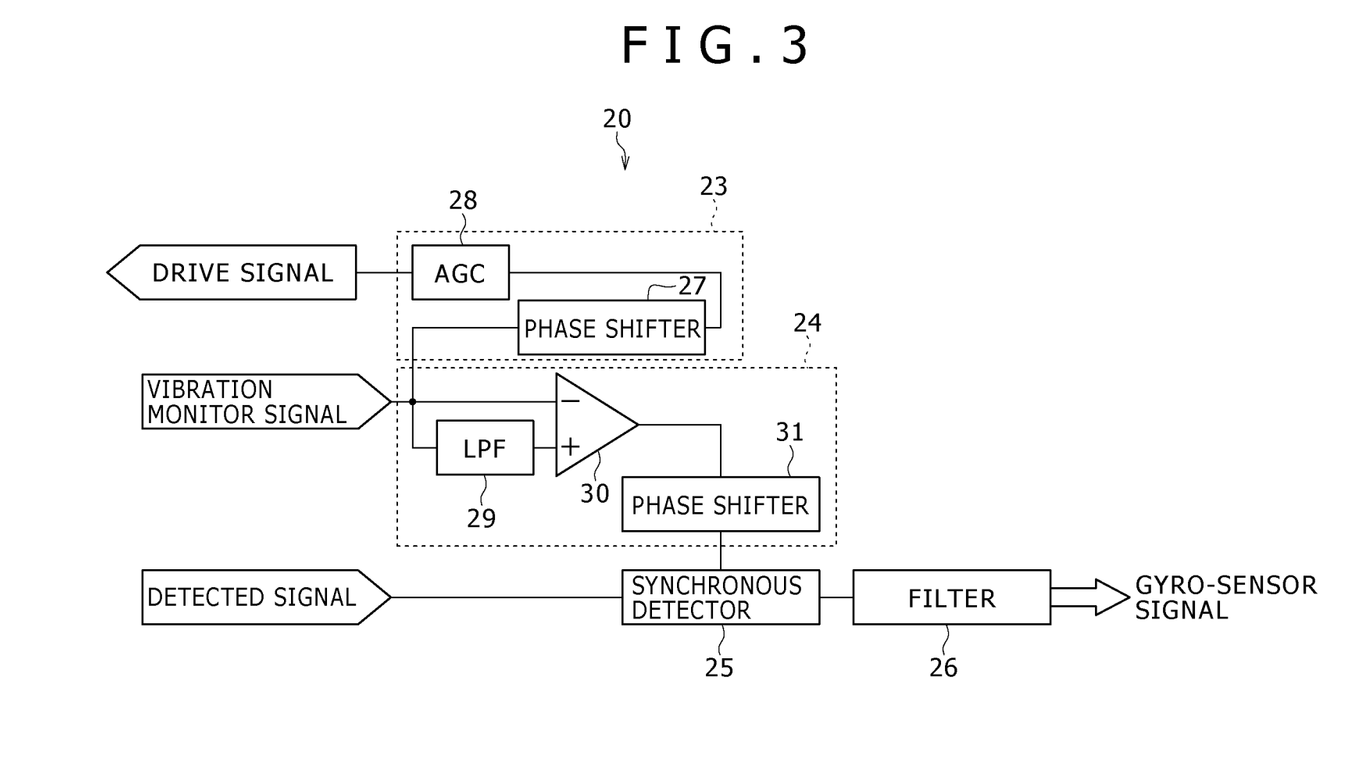
FIG. 3 is a block diagram of the vibratory gyro circuit.

FIG. 1 is a schematic perspective view of a vibratory section 10 of a vibratory gyro-sensor 100 according to a first embodiment of the present disclosure. FIG. 2 is a wiring diagram of the vibratory section 10 and a vibratory gyro circuit 20 of the vibratory gyro-sensor. FIG. 3 is a block diagram of the vibratory gyro circuit 20. FIGS. 4A to 4F are diagrams showing the waveforms of signals output when the vibratory gyro-sensor 100 operates.

As shown in FIGS. 1 through 3, the vibratory gyro-sensor 100 includes the vibratory section 10 and the vibratory gyro circuit 20.

As shown in FIG. 1, the vibratory section 10 includes a vibrator 11 and a piezoelectric element 14 disposed on the vibrator 11. The vibrator 11 has a beam 12 in the form of a rectangular parallelepiped which is elongate in one direction (Y-axis direction), and a base 13 which supports an end of the beam 12.

The piezoelectric element 14 has a piezoelectric film 15 of lead zirconate titanate (PZT) disposed on an upper surface of the vibrator 11. The piezoelectric element 14 also has a drive electrode 16 disposed on the piezoelectric film 15 centrally in a widthwise direction (X-axis direction) of the beam 12, and a first detecting electrode 17 and a second detecting electrode 18 which are disposed one on each side of the drive electrode 16 in sandwiching relation to the drive electrode 16.

As shown in FIGS. 2 and 3, the vibratory gyro circuit 20 includes an adder 21, a subtractor 22, a drive signal output section 23 (see the broken lines in FIG. 3), a timing signal output section 24 (see the broken lines in FIG. 3), a synchronous detector 25, and a filter 26. The vibratory gyro circuit 20 is in the form of an IC (Integrated Circuit) on a single semiconductor chip.

Figure 4A:
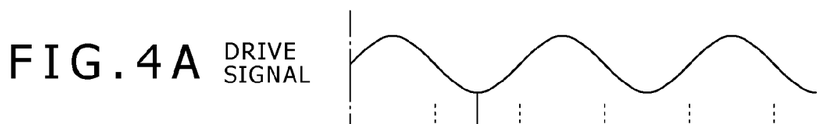
FIGS. 4A to 4F are diagrams showing the waveforms of signals output when the vibratory gyro-sensor operates.
Figure 4B:
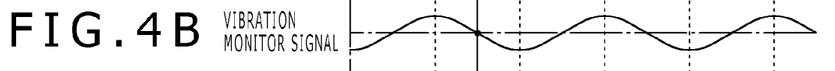

The adder 21 generates a sum signal of a first detected signal which is detected by the first detecting electrode 17 and a second detected signal which is detected by the second detecting electrode 18, and outputs the generated sum signal as a vibration monitor signal representative of a vibrating state of the vibratory section 10 (see FIG. 4B).

Figure 4C:
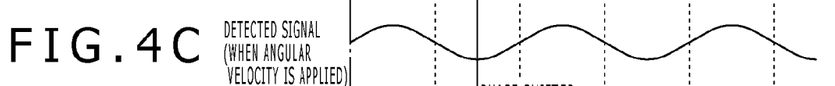
Figure 4D:
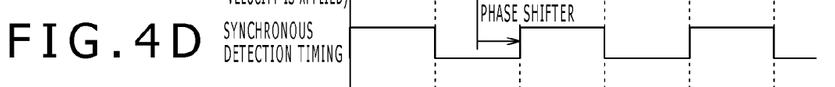
Figure 4E:
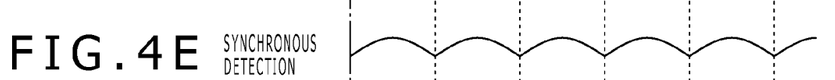
Figure 4F:
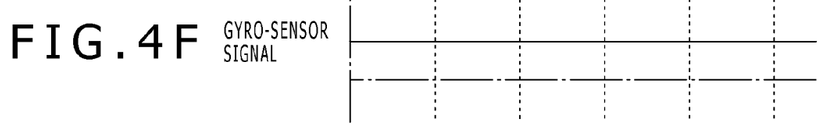

The subtractor 22 generates a differential signal between the first detected signal detected by the first detecting electrode 17 and the second detected signal detected by the second detecting electrode 18, and outputs the generated differential signal as a detected signal of the vibratory section 10 (see FIG. 4C).

The drive signal output section 23 adjusts the amplitude and phase of the vibration monitor signal, and outputs the vibration monitor signal with the adjusted amplitude and phase as a drive signal (see FIGS. 4A and 4B). The drive signal output section 23 includes a second phase shifter 27 for shifting the phase of the vibration monitor signal by a certain shift (e.g., 90°), and an automatic gain controller 28 (AGC: Automatic Gain Control) (amplitude adjuster) for adjusting the amplitude of the vibration monitor signal to a constant amplitude. The drive signal output from the drive signal output section 23 is applied to the drive electrode 16, which causes the vibrator 11 to oscillate by itself.

Figure 5:
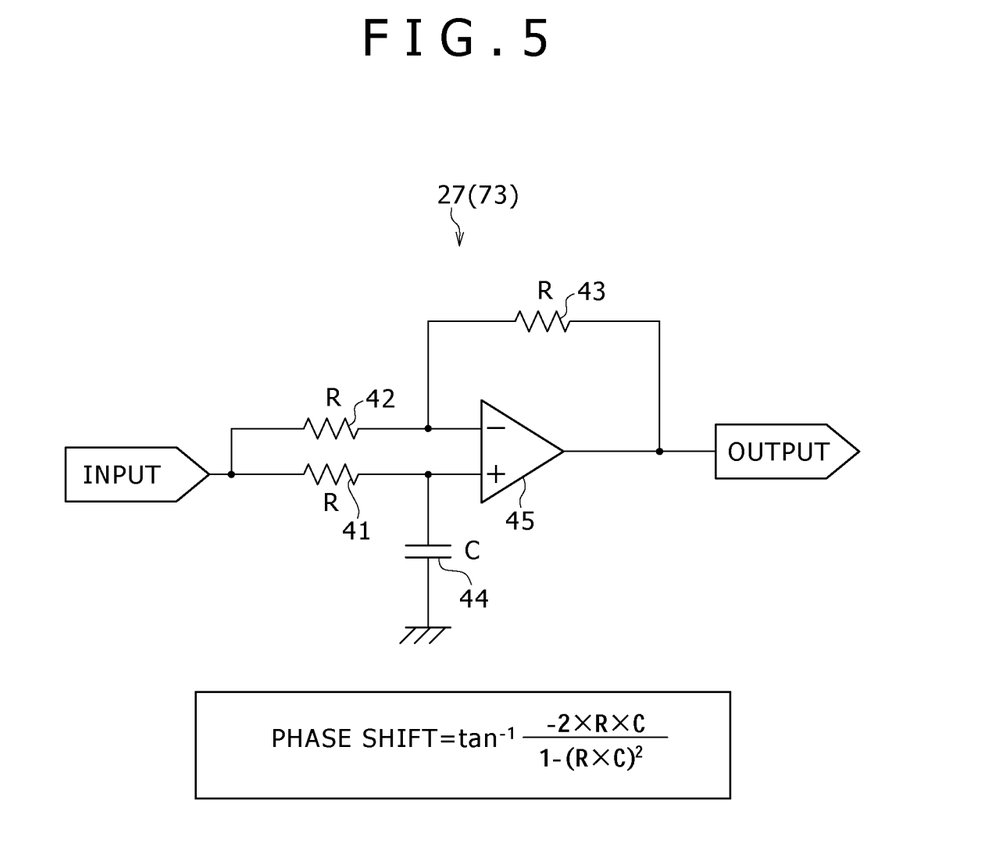
FIG. 5 is a circuit diagram showing an example of second phase shifter.

FIG. 5 is a circuit diagram showing an example of the second phase shifter 27.

As shown in FIG. 5, the second phase shifter 27 includes three resistors 41, 42, 43 each having a resistance value R, a capacitor 44 having an electrostatic capacitance C, and an operational amplifier 45. The second phase shifter 27 has an input terminal connected to a positive feedback terminal of the operational amplifier 45 through the resistor 41 and also to a negative feedback terminal of the operational amplifier 45 through the resistor 42. The capacitor 44 is connected between the positive feedback terminal of the operational amplifier 45 and ground (GND). The resistor 43 is connected between the negative feedback terminal of the operational amplifier 45 and an output terminal thereof.

The second phase shifter 27 shown in FIG. 5 outputs a signal which is shifted in phase from its input signal (vibration monitor signal) by a phase shift (phase delay) expressed by the following equation (1):

$$\text{Phase shift} = \tan^{-1} - 2RC/\{(1-(RC)^2\} \tag{1}$$

When the drive signal is applied to the drive electrode 16, the beam 12 of the vibrator 11 flexurally vibrates in a direction (Z-axis direction) perpendicular to the longitudinal direction (Y-axis direction) of the beam 12. If no angular velocity is applied about a longitudinal central axis of the beam 12, then the first detected signal detected by the first detecting electrode 17 and the second detected signal detected by the second detecting electrode 18 are equal in amplitude and phase to each other. Therefore, the output signal from the subtractor 22, i.e., the detected signal of the vibratory section 10, represents zero.

If an angular velocity is applied about a longitudinal central axis of the beam 12 while the beam 12 is flexurally vibrating, then a Coriolis force depending on the angular velocity is generated in a direction (X-axis direction) which is perpendicular to the longitudinal direction of the beam 12 and the flexurally vibrating direction. When the Coriolis force is generated, the beam 12 vibrates also in the X-axis direction, thereby producing a phase difference depending on the magnitude of the Coriolis force between the first detected signal and the second detected signal. The phase difference between the two detected signals causes the subtractor 22 to output a detected signal depending on the magnitude of the Coriolis force (the magnitude of the angular velocity) (see FIG. 4C).

The detected signal of the vibratory section 10 output from the subtractor 22 is input to the synchronous detector 25. The synchronous detector 25 synchronously detects the detected signal (see FIG. 4E) in timed relation to a timing signal (see FIG. 4D) for synchronous detection output from the timing signal output section 24 (first phase shifter 31). The filter 26 smoothes the signal synchronously detected by the synchronous detector 25 into a gyro signal (angular velocity signal), and outputs the gyro signal (see FIG. 4F).

The timing signal output section 24 binarizes the vibration monitor signal and shifts the phase of the vibration monitor signal. The timing signal output section 24 then outputs the vibration monitor signal which has been binarized and shifted in phase as a timing signal for synchronous detection. The timing signal output section 24 includes a low-pass filter 29 for extracting a low-frequency component of the vibration monitor signal, and a comparator 30 for converting the vibration monitor signal into a binary signal using the low-frequency component of the vibration monitor signal which is extracted by the low-pass filter 29 as a threshold value. The timing signal output section 24 also includes a first phase shifter 31 for shifting the phase of the binary signal output from the comparator 30 by a certain phase (e.g., 90°).

Figure 6A:
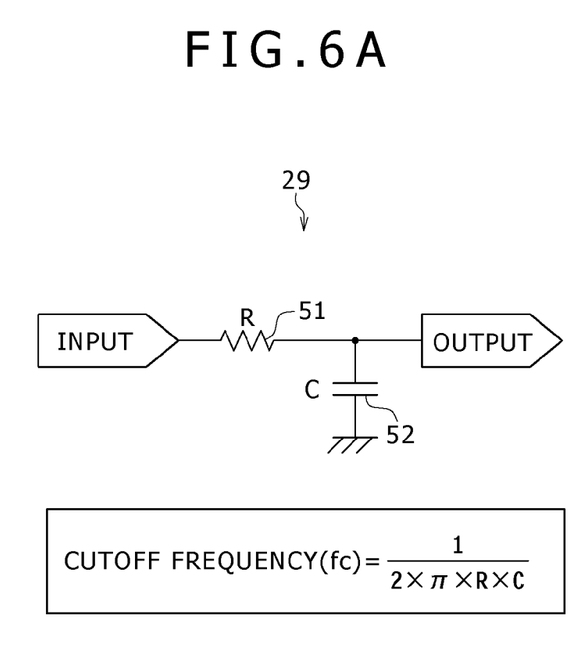
FIGS. 6A and 6B are circuit diagrams showing examples of a low-pass filter.
Figure 6B:
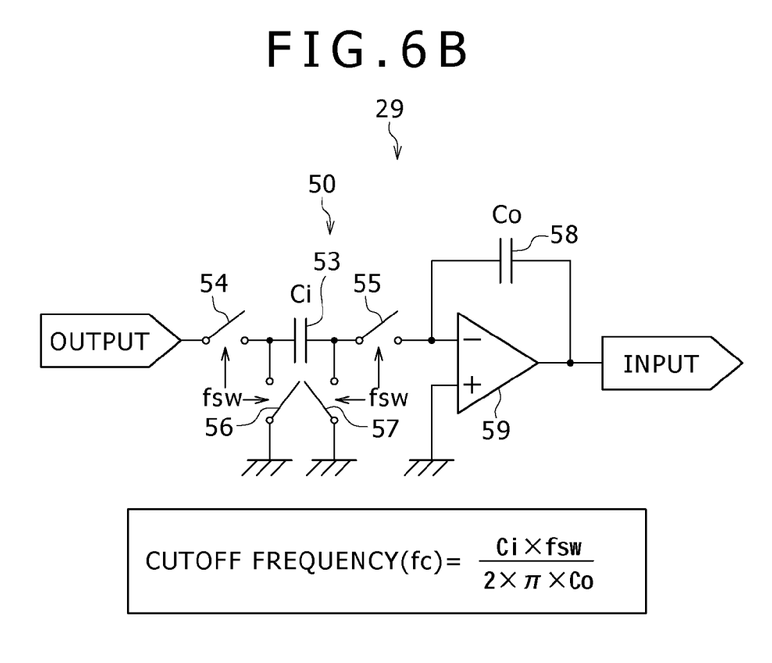

FIGS. 6A and 6B are circuit diagrams showing examples of the low-pass filter 29.

FIG. 6A shows an example of low-pass filter 29 which includes a resistor 51 and a capacitor 52. FIG. 6B shows another example of low-pass filter 29 which is in the form of a filter circuit including a switched capacitor 50.

In the example shown in FIG. 6A, the resistor 51 is connected between input and output terminals and has a resistance value R, and the capacitor 52 is connected between an output end of the resistor 51 and ground and has an electrostatic capacitance C. The low-pass filter 29 shown in FIG. 6A has a cutoff frequency fc expressed by the following equation (2):

$$fc = 1/2\pi RC \qquad (2)$$

In the example shown in FIG. 6B, the low-pass filter 29 is of an arrangement which is generally referred to as a switched capacitance filter. The low-pass filter 29 includes, in addition to the switched capacitor 50, an operational amplifier 59 and an output capacitor 58.

The switched capacitor 50 includes an input capacitor 53 having an electrostatic capacitance Ci, a switch 54 connected between the input terminal and the input capacitor 53, and a switch 55 connected between the input capacitor 53 and a negative feedback terminal of the operational amplifier 59. The switched capacitor 50 also includes a switch 56 connected between an input end of the input capacitor 53 and ground and a switch 57 connected between an output end of the input capacitor 53 and ground.

The output capacitor 58, which has an electrostatic capacitance Co, is connected between the output terminal of the operational amplifier 59 and the negative feedback terminal thereof. The operational amplifier 59 has its positive feedback terminal connected to ground or a reference potential.

The low-pass filter 29 shown in FIG. 6B has a cutoff frequency fc expressed by the following equation (3):

$$fc = Cifsw/2\pi Co \qquad (3)$$

where fsw represents a switching frequency.

Figure 7:
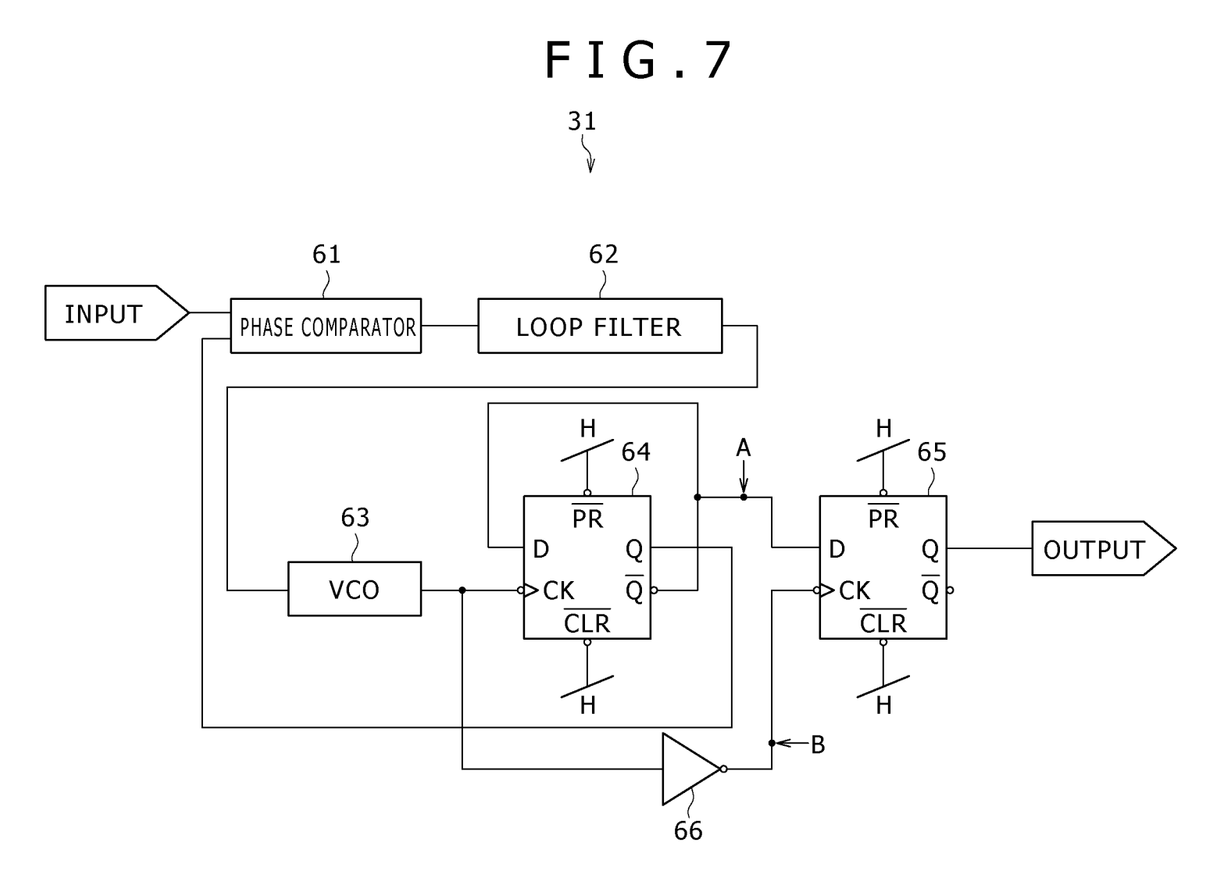
FIG. 7 is a block diagram showing an example of a first phase shifter.
Figure 8A:
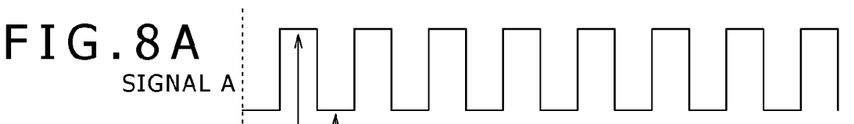
FIGS. 8A to 8C are diagrams showing the relationship between a signal A at a point A, a signal B at a point B, and an output signal from the first phase shifter shown in FIG. 7.

FIG. 7 is a block diagram showing an example of the first phase shifter 31. FIGS. 8A, B, and C are diagrams showing the relationship between a signal A at a point A, a signal B at a point B, and an output signal from the first phase shifter 31 shown in FIG. 7.

As shown in FIG. 7, the first phase shifter 31 includes a phase comparator 61, a loop filter 62, a voltage-controlled oscillator (VCO) 63, a first flip-flop 64, a second flip-flop 65, and an inverter 66.

The phase comparator 61 uses the vibration monitor signal binarized by the comparator 30 as a reference signal. The phase comparator 61 outputs a phase difference signal depending on the phase difference between the reference signal and a comparison signal output from a Q output terminal of the first flip-flop 64. The loop filter 62 smoothes the phase difference signal output from the phase comparator 61 and outputs a frequency control signal.

The voltage-controlled oscillator 63 outputs an oscillation signal of a rectangular waveform which has frequency characteristics depending on the frequency control signal output from the loop filter 62.

Each of the first flip-flop 64 and the second flip-flop 65 is in the form of a D flip-flop. Each of the first flip-flop 64 and the second flip-flop 65 has a D input terminal, a CK (clock) input terminal, a Q output terminal, Q_output terminal (inverting output terminal), a CLR_(clear) output terminal, and PR_ (preset) terminal. The symbol "_" means an inversion, which is represented by an overbar in FIG. 7.

The first flip-flop 64 serves to frequency-divide the oscillation signal, i.e., serves as a frequency divider. The second flip-flop 65 serves to generate the timing signal for synchronous detection, i.e., serves as a timing generator.

The Q output terminal of the first flip-flop 64 is connected to an input terminal of the phase comparator 61. The Q_output terminal of the first flip-flop 64 is connected to the D input terminal thereof. The Q_output terminal of the first flip-flop 64 is connected to the D input terminal of the second flip-flop 65. The voltage-controlled oscillator 63 has an output terminal connected to the CK input terminal of the second flip-flop 65 through the inverter 66.

The oscillation signal output from the voltage-controlled oscillator 63 is input to the CK input terminal of the first flip-flop 64. When the oscillation signal, which has a rectangular waveform, input to the CK input terminal of the first flip-flop 64 changes from a low level to a high level, the first flip-flop 64 changes the level of the signal output from the Q output terminal thereof to the level of the signal input to the D input terminal, i.e., the level of the output signal from the Q_output terminal. Otherwise, the first flip-flop 64 holds the level of the signal output from the Q output terminal thereof.

Therefore, the Q output terminal of the first flip-flop 64 outputs a frequency-divided signal representative of the oscillation signal, whose frequency is divided by 2, from the voltage-controlled oscillator 63. The frequency-divided signal is input to the input terminal of the phase comparator 61 as a comparison signal of the phase comparator 61.

The Q_output terminal of the first flip-flop 64 outputs a signal (inverted phase signal) whose phase is an inversion of the phase of the frequency-divided signal output from the Q output terminal. The inverted phase signal is input to the D input terminal of the first flip-flop 64 and the D input terminal of the second flip-flop 65. The oscillation signal output from the voltage-controlled oscillator 63 is input to the CK input terminal of the second flip-flop 65 through the inverter 66.

Figure 8B:
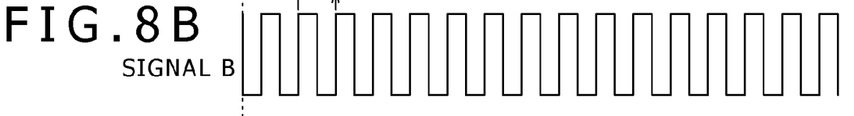
Figure 8C:
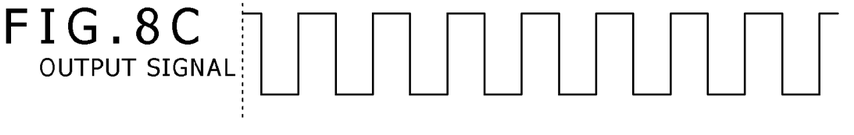

FIGS. 8A, 8B, and 8C show the waveform of a signal A at a point A in FIG. 7, the waveform of a signal B at a point B in FIG. 7, and the waveform of a signal output from the Q output terminal of the second flip-flop 65.

The D input terminal of the second flip-flop 65 is supplied with the signal A whose waveform is shown in FIG. 8A. The CK input terminal of the second flip-flop 65 is supplied the signal B whose waveform is shown in FIG. 8B, i.e., the oscillation signal that has passed through the inverter 66.

When the signal B input to the CK input terminal of the second flip-flop 65 changes from a low level to a high level, the second flip-flop 65 changes the level of the signal output from the Q output terminal thereof to the level of the signal A input to the D input terminal. Otherwise, the second flip-flop 65 holds the level of the signal output from the Q output terminal thereof.

Therefore, the Q output terminal of the second flip-flop 65 outputs a signal having a waveform shown in FIG. 8C. The signal output from the Q output terminal of the second flip-flop 65 has its phase delayed by 90° from the signal input to the first phase shifter 31. The first phase shifter 31 thus delays the phase of the binary signal output from the comparator 30 by 90°.

Since the first phase shifter 31 shown in FIG. 7 is of a PLL (Phase Locked Loop) circuit arrangement, even if the frequency of the vibration monitor signal varies, it can accurately shift the phase of the binary signal output from the comparator 30 in a manner to follow such variations of the frequency of the vibration monitor signal.

It has been described above that the frequency-dividing ratio is 2 and the phase shift is 90°. However, another frequency-dividing ratio and a phase shift other than 90° may be used. The first flip-flop 64 and the second flip-flop 65 may be replaced with a first frequency counter and a second frequency counter, respectively. Specifically, the first frequency counter may count the frequency of the oscillation signal output from the voltage-controlled oscillator 63 up to a desired count and generate a first count signal. The first count signal may be input to the input terminal of the phase comparator 61. The second frequency counter may count the frequency of the oscillation signal output from the voltage-controlled oscillator 63 up to a desired count, using the binary signal as an enable signal, and generate a second count signal. The second count signal may be output as the timing signal for synchronous detection to the synchronous detector 25.

[Operation]

Operation of the vibratory gyro-sensor 100 according to the first embodiment will be described below. First, a vibratory gyro circuit 120 (see FIG. 9) according to a comparative example will be described below.

COMPARATIVE EXAMPLE

Figure 9:
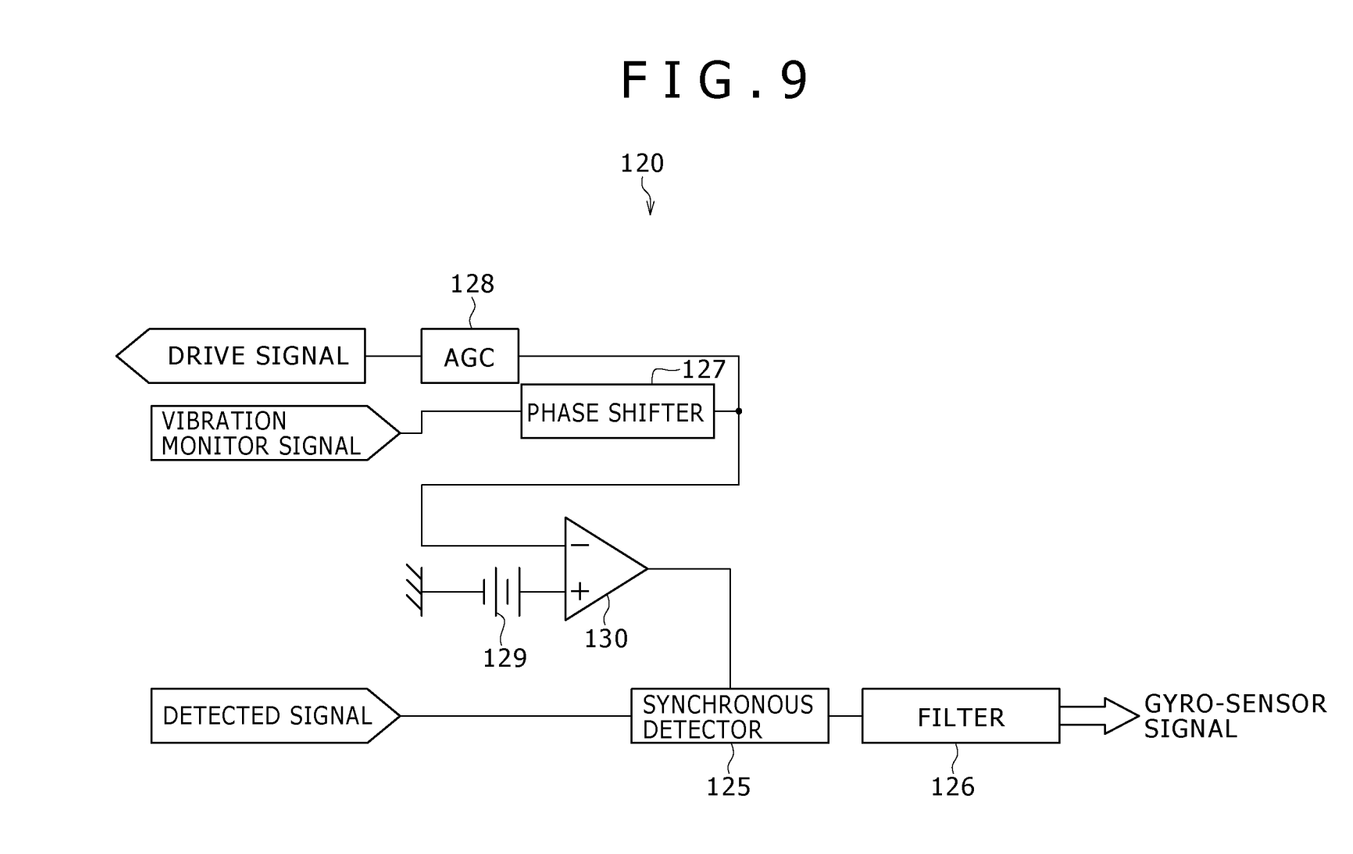
FIG. 9 is a block diagram of a vibratory gyro-sensor according to a comparative example.

FIG. 9 is a block diagram of the vibratory gyro circuit 120 according to the comparative example.

As shown in FIG. 9, the vibratory gyro circuit 120 according to the comparative example includes a phase shifter 127, an automatic gain controller (AGC) 128, a comparator 130, a reference voltage supply 129, a synchronous detector 125, and a filter 126.

The phase shifter 127 shifts the phase of a vibration monitor signal. The vibration monitor signal with the shifted phase is input to the automatic gain controller 128, which adjusts the amplitude of the vibration monitor signal and outputs the vibration monitor signal with the adjusted amplitude as a drive signal. The vibration monitor signal with the shifted phase is also input to the comparator 130. The comparator 130 converts the vibration monitor signal with the shifted phase into a binary signal using a signal supplied from the reference voltage source 129 as a threshold value. The binary signal output from the comparator 130 is input as a timing signal for synchronous detection to the synchronous detector 125.

The synchronous detector 125 synchronously detects the detected signal in synchronism with the timing signal for synchronous detection. The filter 126 smoothes the signal which is synchronously detected by the synchronous detector 125 into a gyro signal (angular velocity signal), and outputs the gyro signal.

Figure 10A:
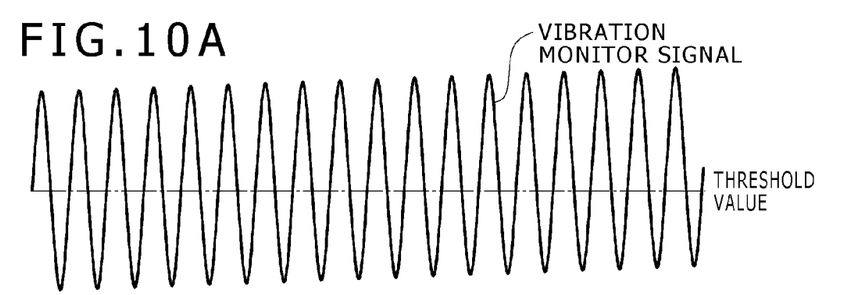
FIGS. 10A and 10B are diagrams showing the relationship between a vibration monitor signal input to a comparator, a threshold value for the comparator, and a binarized signal output from the comparator in the comparative example.
Figure 10B:
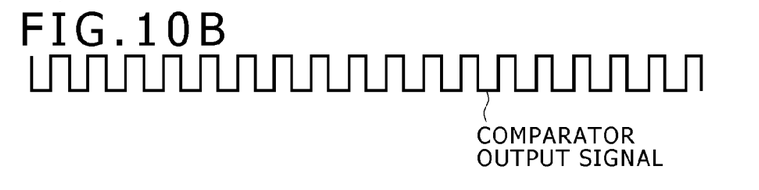

FIGS. 10A and 10B are diagrams showing the relationship between the vibration monitor signal input to the comparator 130 and a threshold value for the comparator 130 (FIG. 10A), and a binary signal output from the comparator 130 (FIG. 10B) in the comparative example. FIG. 10A shows an example in which the vibration monitor signal is shifted upwardly at the time the low-frequency component of the vibration monitor signal varies due to a time-dependent change in the impedance of the vibratory section 10 or the vibratory gyro circuit 120.

In the comparative example shown in FIG. 9, the signal which serves as the threshold value for the comparator 130 is of a fixed value input from the reference voltage source 129. If the vibration monitor signal is shifted upwardly at the time the low-frequency component of the vibration monitor signal varies due to a time-dependent change in the impedance of the vibratory section 10 or the vibratory gyro circuit 120, as shown in FIG. 10A, the threshold value is shifted out of alignment with the center of the amplitude of the vibration monitor signal. Therefore, as shown in FIG. 10B, the duty ratio of the binary signal output from the comparator 130 is gradually shifted away from 50%. According to the comparative example, as a result, the synchronous detector 125 is unable to accurately synchronously detect the detected signal, so that noise tends to be added to the angular velocity signal.

Present Embodiment

The vibratory gyro-sensor 100 according to the present embodiment will be described below.

Figure 11A:
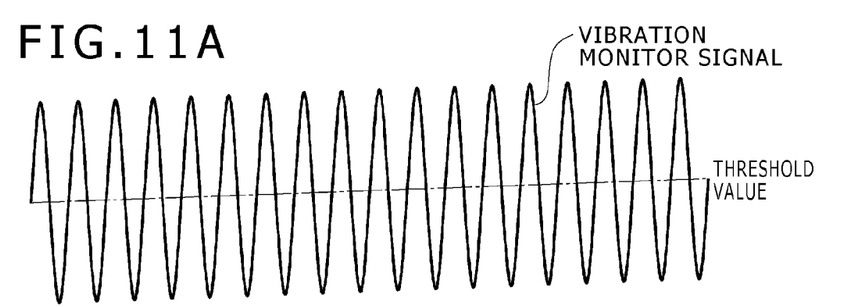
FIGS. 11A and 11B are diagrams showing the relationship between a vibration monitor signal input to a comparator, a signal input to the comparator which has passed through a low-pass filter (a threshold value for the comparator), and a binarized signal output from the comparator in the embodiment of the present disclosure.
Figure 11B:
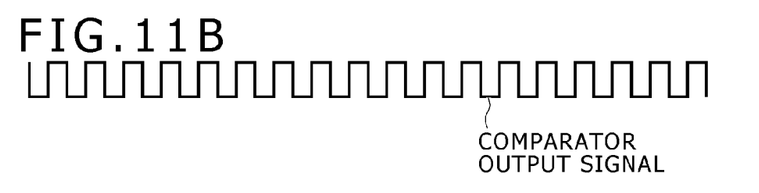

FIGS. 11A and 11B show the relationship between the vibration monitor signal input to the comparator 30 and the signal input to the comparator 30 which has passed through the low-pass filter 29 (the threshold value for the comparator 30) (FIG. 11A), and the binary signal output from the comparator 30 (FIG. 11B) in the present embodiment.

FIG. 11A shows an example in which the vibration monitor signal is shifted upwardly at the time the low-frequency component of the vibration monitor signal varies due to a time-dependent change in the impedance of the vibratory section 10 or the vibratory gyro circuit 20.

According to the present embodiment, as described above, the comparator 30 converts the vibration monitor signal into a binary signal using the low-frequency component of the vibration monitor signal which is extracted by the low-pass filter 29 as a threshold value. Therefore, as shown in FIG. 11A, even if the vibration monitor signal is shifted upwardly at the time the low-frequency component of the vibration monitor signal input to the comparator 30 varies, the threshold value for the comparator 30 also varies in a manner to follow such variations in the low-frequency component of the vibration monitor signal.

Consequently, even when the low-frequency component of the vibration monitor signal varies, the comparator 30 can generate a binary signal having an "H" interval and an "L" interval that are substantially equal to each other, i.e., having a duty ratio of 50%, as shown in FIG. 11B. As a consequence, the synchronous detector 25 can synchronously detect the detected signal at an appropriate timing, so that noise is prevented from being added to the gyro signal (angular velocity signal).

According to the present embodiment, moreover, the vibratory gyro-sensor can be manufactured at a reduced cost because it is possible to generate a binary signal having an "H" interval and an "L" interval that are substantially equal to each other with a simple circuit arrangement.

According to the present embodiment, as described above, it is desirable for the comparator 30 to generate a binary signal having an "H" interval and an "L" interval that are substantially equal to each other, i.e., having a duty ratio of 50%. On the other hand, if the cutoff frequency of the low-pass filter 29 is not appropriate, then the vibration monitor signal input to the comparator 30 and the signal serving as the threshold value for the comparator 30 which has passed through the low-pass filter 29 are brought widely out of phase with each other. In such a case, the duty ratio of the output signal from the comparator 30 is shifted away from 50%, and it is not possible to generate a binary signal having an "H" interval and an "L" interval that are substantially equal to each other. Consequently, the low-pass filter 29 should its cutoff frequency fc set to an appropriate value.

Typically, the cutoff frequency fc of the low-pass filter 29 is set to 100 Hz or higher. With the cutoff frequency fc of the low-pass filter 29 being set to 100 Hz or higher, any phase delay of the signal which has passed through the low-pass filter 29, i.e., the signal serving as the comparator threshold value, is 1° or smaller at a frequency of 1 Hz or lower. Therefore, when the cutoff frequency fc of the low-pass filter 29 is set to 100 Hz or higher, the phase difference between the vibration monitor signal input to the comparator 30 and the signal (whose frequency is 1 Hz or lower) which has passed through the low-pass filter 29 as the threshold value is 1° or smaller. The comparator 30 can thus generate a binary signal having an "H" interval and an "L" interval that are substantially equal to each other. If the cutoff frequency fc of the low-pass filter 29 is set to 1 kHz, then the phase difference between the vibration monitor signal and the signal (whose frequency is 1 Hz or lower) which has passed through the low-pass filter 29 is substantially zero.

If the low-pass filter 29 is of the circuit arrangement shown in FIG. 6A, then the cutoff frequency fc thereof may be set to 100 Hz or higher by setting the resistance R and the capacitance C to appropriate values. If the low-pass filter 29 is of the circuit arrangement shown in FIG. 6B, then the cutoff frequency fc thereof may be set to 100 Hz or higher by setting Ci, fsw, and Co to appropriate values. The cutoff frequency fc of the low-pass filter 29 is typically set to 1/10 or smaller of the drive frequency of the vibratory section 10.

Second Embodiment

A second embodiment of the present disclosure will be described below. Those parts of the second embodiment and other modifications which are identical in structure and function to those of the first embodiment are denoted by identical reference characters, and will not be described in detail below or will be described briefly below.

Figure 12:
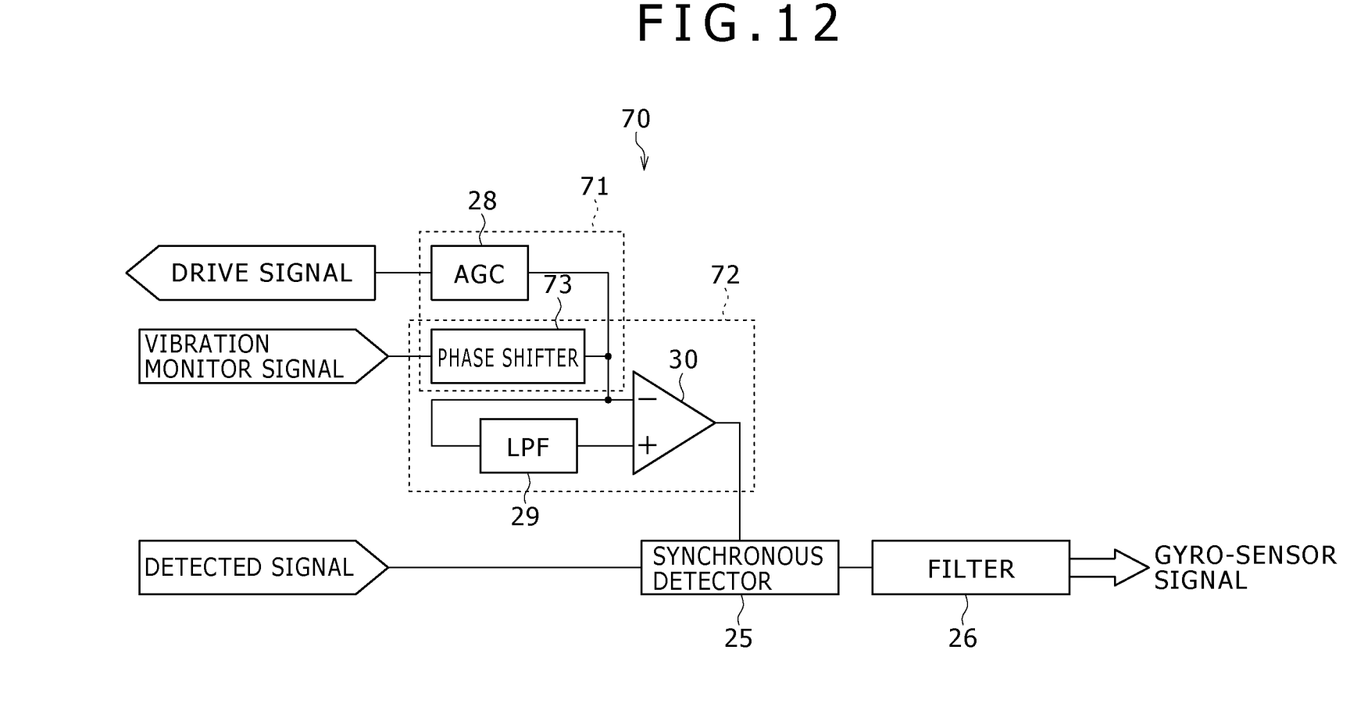
FIG. 12 is a block diagram of a vibratory gyro-sensor according to another embodiment of the present disclosure.

FIG. 12 is a block diagram of a vibratory gyro circuit 70 according to a second embodiment of the present disclosure.

According to the second embodiment, as shown in FIG. 12, a phase shifter 73 is associated with the vibratory section 10 rather than the comparator 30. The second embodiment is different from the first embodiment in that the phase shifter 73 shifts the phase of the vibration motor signal from the vibratory section 10, and the comparator 30 binarizes the vibration motor signal with the shifted phase. The second embodiment is also different from the first embodiment in that the phase shifter 73 is shared by a timing signal output section 72 and a drive signal output section 71.

As shown in FIG. 12, the vibratory gyro circuit 70 includes the drive signal output section 71, the timing signal output section 72, the synchronous detector 25, and the filter 26. The drive signal output section 71 includes a phase shifter 73 and the automatic gain controller 28. The timing signal output section 72 includes the phase shifter 73 which it shares with the drive signal output section 71, the low-pass filter 29, and the comparator 30.

The phase shifter 73 may be of the circuit arrangement shown in FIG. 5, i.e., a phase shifter for analog signals. The circuit arrangement shown in FIG. 5 represents an example of the second phase shifter 27 according to the first embodiment.

The phase shifter 73 shifts the phase of the vibration monitor signal. The vibration monitor signal with the shifted phase is input to the automatic gain controller 28, which adjusts the amplitude of the vibration monitor signal and outputs the vibration monitor signal with the adjusted amplitude as a drive signal. The vibration monitor signal with the shifted phase is also input to the comparator 130. The comparator 30 converts the vibration monitor signal with the shifted phase into a binary signal using the vibration monitor signal which has passed through the low-pass filter 29 as a threshold value. The binary signal output from the comparator 30 is input as a timing signal for synchronous detection to the synchronous detector 25.

The synchronous detector 25 synchronously detects the detected signal in synchronism with the timing signal for synchronous detection. The filter 26 smoothes the signal synchronously detected by the synchronous detector 25 into a gyro signal (angular velocity signal), and outputs the gyro signal.

According to the second embodiment, after the phase shifter 73 shifts the phase of the vibration monitor signal, the comparator 30 binarizes the vibration monitor signal. The second embodiment offers the same advantages as the first embodiment. Specifically, even when the low-frequency component of the vibration monitor signal varies, the comparator 30 can generate a binary signal having an "H" interval and an "L" interval that are substantially equal to each other. As a consequence, noise is prevented from being added to the gyro signal (angular velocity signal).

According to the second embodiment, the phase shifter 73, which is of a simple circuit arrangement for shifting the phase of analog signals, can be used as a phase shifter in the timing signal output section 72. Therefore, the cost of the vibratory gyro circuit 70 can be reduced. According to the second embodiment, furthermore, the vibratory gyro circuit 70 is made less costly because the single common phase shifter 73 is shared by the drive signal output section 71 and the timing signal output section 72. However, the drive signal output section 71 and the timing signal output section 72 may not share the single common phase shifter 73, but may have respective phase shifters which cause different phase shifts.

<Modifications>

Figure 13:
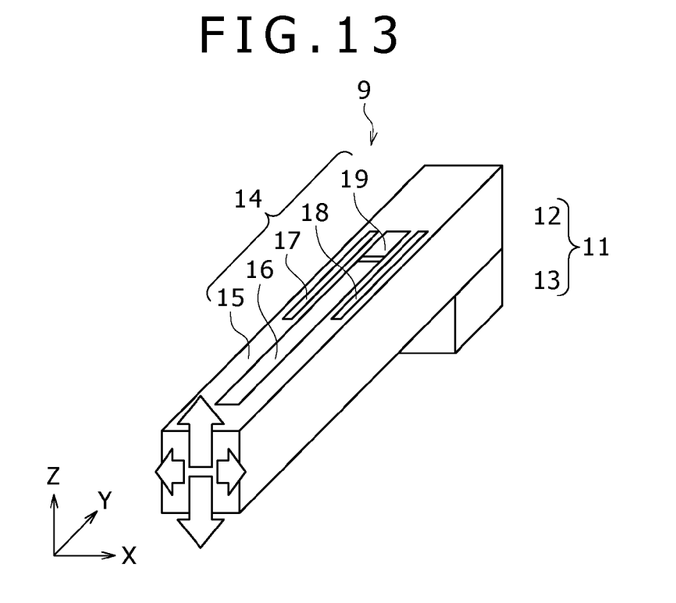
FIG. 13 is a schematic perspective view showing another example of vibratory section.
Figure 14:
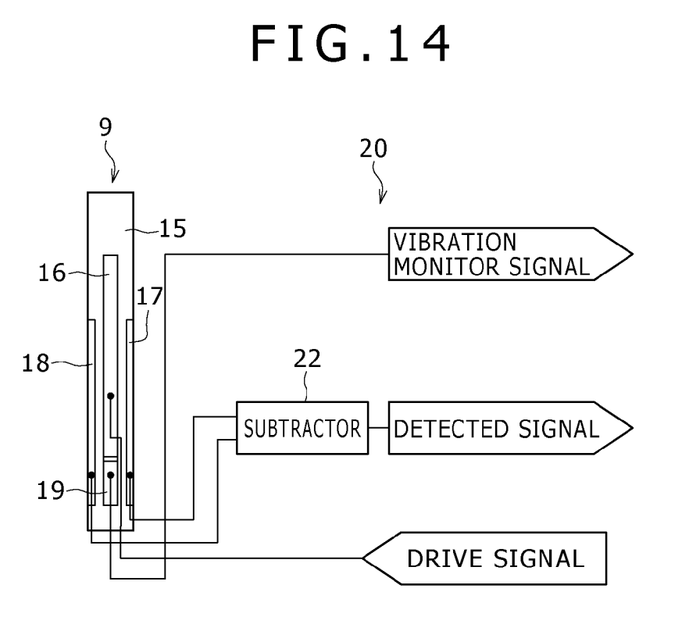
FIG. 14 is a wiring diagram of the vibratory section shown in FIG. 13 and a vibratory gyro circuit.

FIG. 13 is a schematic perspective view showing another example of vibratory section, and FIG. 14 is a wiring diagram of the vibratory section shown in FIG. 13 and a vibratory gyro circuit.

As shown in FIGS. 13 and 14, a vibratory section 9 includes a vibration monitor electrode 19 on the piezoelectric film 15 disposed on the beam 12 of the vibrator 11. The vibration monitor electrode 19 is positioned next to one end of the drive electrode 16 centrally in the widthwise direction (X-axis direction) of the beam 12. As shown in FIG. 14, the vibration monitor signal is directly output from the vibration monitor electrode 19. The vibratory section 9 shown in FIGS. 13 and 14 is free of the adder 21 shown in FIG. 2. Otherwise, the vibratory section 9 shown in FIGS. 13 and 14 is of the same structure as the vibratory section 10 shown in FIGS. 1 and 2.

The present disclosure contains subject matter related to that disclosed in Japanese Priority Patent Application JP 2010-269772 filed in the Japan Patent Office on Dec. 2, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A vibratory gyro-sensor comprising:
   a vibratory section;
   a synchronous detector which synchronously detects a detected signal from said vibratory section in timed relation to a timing signal for synchronous detection; and
   a timing signal output section which outputs said timing signal for synchronous detection, said timing signal output section including (a) a low-pass filter which extracts a low-frequency component of a vibration monitor signal representative of a vibrating state of said vibrating section, (b) a comparator which converts said vibration monitor signal into a binary signal using the low-frequency component of the vibration monitor signal which is extracted by said low-pass filter as a threshold value, and (c) a first phase shifter which shifts the phase of said vibration monitor signal,
   wherein,
      the vibration monitor signal as converted into the binary signal by said comparator and shifted in phase by said first phase shifter is used as said timing signal for synchronous detection.

2. The vibratory gyro-sensor according to claim 1, wherein said first phase shifter shifts the phase of said vibration monitor signal after said vibration monitor signal is converted into the binary signal by said comparator.

3. The vibratory gyro-sensor according to claim 2, wherein said first phase shifter includes:
- a phase comparator which outputs a phase difference signal depending on the phase difference between said vibration monitor signal is converted into the binary signal by said comparator and a comparison signal;
- a loop filter which smoothes said phase difference signal and outputs a frequency control signal;
- a voltage-controlled oscillator which outputs an oscillation signal having frequency characteristics depending on said frequency control signal;
- a frequency divider which outputs a frequency-divided signal produced by frequency-dividing said oscillation signal at a predetermined ratio as said comparison signal; and
- a timing generator which inputs said oscillation signal and said frequency-divided signal and outputs said vibration monitor signal as converted into the binary signal and shifted in phase.

4. The vibratory gyro-sensor according to claim 1, wherein said first phase shifter shifts the phase of said vibration monitor signal before said vibration monitor signal is converted into the binary signal by said comparator.

5. The vibratory gyro-sensor according to claim 1, further comprising:
- a drive signal output section which outputs a drive signal for said vibratory section, said drive signal output section including (a) a second phase shifter which shifts the phase of said vibration monitor signal, and (b) an amplitude adjuster which adjusts the amplitude of said vibration monitor signal,
  wherein,
    said vibration monitor signal as shifted in phase by said second phase shifter and adjusted in amplitude by said amplitude adjuster is used as said drive signal for said vibratory section.

6. The vibratory gyro-sensor according to claim 5, wherein:
- said first phase shifter shifts the phase of said vibration monitor signal before said vibration monitor signal is converted into the binary signal by said comparator,
- said second phase shifter shifts the phase of said vibration monitor signal before said vibration monitor signal is adjusted in amplitude by said amplitude adjuster, and
- said first phase shifter and said second phase shifter are in the form of a single common phase shifter.

7. The vibratory gyro-sensor according to claim 1, wherein said low-pass filter has a cutoff frequency of 100 Hz or higher.

8. The vibratory gyro-sensor according to claim 1, wherein said low-pass filter comprises a resistor and a capacitor.

9. The vibratory gyro-sensor according to claim 1, wherein said low-pass filter comprises a filter circuit including a switched capacitor.

10. A vibratory gyro circuit comprising:
- a synchronous detector which synchronously detects a detected signal from a vibratory section in timed relation to a timing signal for synchronous detection; and
- a timing signal output section which outputs said timing signal for synchronous detection, said timing signal output section including (a) a low-pass filter which extracts a low-frequency component of a vibration monitor signal representative of a vibrating state of said vibrating section, (b) a comparator which converts said vibration monitor signal into a binary signal using the low-frequency component of the vibration monitor signal which is extracted by said low-pass filter as a threshold value, and (c) a first phase shifter which shifts the phase of said vibration monitor signal,
wherein,
  the vibration monitor signal as converted into the binary signal by said comparator and shifted in phase by said first phase shifter is used as said timing signal for synchronous detection.

* * * * *